(12) United States Patent
Braegas

(10) Patent No.: US 8,798,888 B2
(45) Date of Patent: Aug. 5, 2014

(54) CONTROL UNIT AND METHOD FOR DRIVER ASSISTANCE

(75) Inventor: Peter Braegas, Hildeshrim-Itzum (DE)

(73) Assignee: Robert Bosch GmbH, Stuttgart (DE)

( * ) Notice: Subject to any disclaimer, the term of this patent is extended or adjusted under 35 U.S.C. 154(b) by 1170 days.

(21) Appl. No.: 12/227,460

(22) PCT Filed: May 9, 2007

(86) PCT No.: PCT/EP2007/054481
§ 371 (c)(1),
(2), (4) Date: Mar. 17, 2009

(87) PCT Pub. No.: WO2007/144238
PCT Pub. Date: Dec. 21, 2007

(65) Prior Publication Data
US 2009/0312912 A1     Dec. 17, 2009

(30) Foreign Application Priority Data

Jun. 12, 2006 (DE) .......................... 10 2006 027 114

(51) Int. Cl.
| | | |
|---|---|---|
| *B60T 7/12* | (2006.01) | |
| *B60T 7/22* | (2006.01) | |
| *B62D 15/02* | (2006.01) | |
| *B60W 30/09* | (2012.01) | |
| *B60T 8/32* | (2006.01) | |
| *B60T 8/58* | (2006.01) | |
| *B60T 8/86* | (2006.01) | |
| *B60W 30/06* | (2006.01) | |
| *B60W 50/14* | (2012.01) | |

(52) U.S. Cl.
CPC ................ *B60T 7/22* (2013.01); *B62D 15/028* (2013.01); *B60W 30/09* (2013.01); *B60T 8/32* (2013.01); *B60T 8/58* (2013.01); *B60T 8/86* (2013.01); *B60T 2201/03* (2013.01); *B60T 2201/10* (2013.01); *B60T 2240/03* (2013.01); *B60T 2270/89* (2013.01); *B62D 15/027* (2013.01); *B62D 15/029* (2013.01); *B60W 30/06* (2013.01); *B60W 50/14* (2013.01)
USPC .................................. 701/78; 701/83; 701/41

(58) Field of Classification Search
CPC ........ B62D 15/27; B62D 15/28; B62D 15/29; B62D 15/0295; B62D 15/027; B62D 15/0275; B62D 15/0285; B62D 15/029; B62D 15/028; B60T 7/00; B60T 7/12; B60T 8/17555; B60T 8/32; B60T 8/58; B60T 8/86; B60T 2201/10; B60T 2201/04; B60T 2201/06; B60T 2240/03; B60T 2260/02; B60T 2270/89; B60T 8/1725; B60T 2201/03; B60W 30/06; B60W 30/09; B60W 50/14; B60W 2050/14; B60W 2050/143; B60W 2050/146; B60W 30/18054; B60W 2710/18; B60W 2720/28; B60W 2422/40; B60W 2422/54; B60W 2422/90; B60W 2422/70; B60W 2422/95; B60W 2540/18; B60W 2540/04; B60W 2540/12; B60W 2420/50; B60W 2420/503; B60W 2420/506; B60W 2420/42; B60W 2420/52; B60W 2420/54; B60W 2520/28; B60W 2550/308; B60W 2422/50
USPC ...................... 701/42, 78, 41, 70, 83; 318/63; 477/903, 904; 180/199, 201
See application file for complete search history.

(56) References Cited

U.S. PATENT DOCUMENTS

| | | | | |
|---|---|---|---|---|
| 4,931,930 A * | 6/1990 | Shyu et al. | ...................... | 701/36 |
| 6,332,654 B1 * | 12/2001 | Yano | ............................... | 303/89 |
| 6,487,481 B2 * | 11/2002 | Tanaka et al. | ................... | 701/41 |
| 6,906,640 B2 * | 6/2005 | Gotzig et al. | ............... | 340/932.2 |
| 6,940,423 B2 * | 9/2005 | Takagi et al. | ............... | 340/932.2 |

FOREIGN PATENT DOCUMENTS

| | | |
|---|---|---|
| DE | 101 05 749 | 8/2002 |
| DE | 102 20 426 | 11/2003 |
| DE | 10 2004 055584 | 7/2005 |
| EP | 1 123 844 | 8/2001 |
| EP | 1 623 912 | 2/2006 |

| | | |
|---|---|---|
| EP | 1 626 384 | 2/2006 |
| FR | 2 785 383 | 5/2000 |
| WO | WO 2005/014371 | 2/2005 |

\* cited by examiner

*Primary Examiner* — Jerrah Edwards
(74) *Attorney, Agent, or Firm* — Kenyon & Kenyon LLP

(57) ABSTRACT

A control unit for a driving assistance of a vehicle includes a data interface for querying sensors for detecting surroundings data of the vehicle, a data interface for querying a steering angle of the vehicle, an arithmetic unit for ascertaining driving instructions based on the surroundings data of the vehicle transmitted by the sensors, a data interface for outputting the driving instructions, the driving instructions including at least one instruction to perform a steering of the vehicle at a standstill, and an interface for activating a braking system of the vehicle in such a way that the vehicle is braked during the steering performed at a standstill until a predefined steering angle is reached.

7 Claims, 3 Drawing Sheets

CONTROL UNIT AND METHOD FOR DRIVER ASSISTANCE

BACKGROUND OF THE INVENTION

1. Field of the Invention

The present invention is directed to a control unit and a method for automated driving assistance.

2. Description of Related Art

Published German patent document DE 102 20 426 describes a method for operating a parking assistance system and a parking assistance system in which a parking space is determined according to its length and/or width when driving past the parking space, and in which a sequence for parking the vehicle into the parking space is determined. The vehicle's driver is instructed in which direction he is to move the vehicle and to what degree is the steering wheel to be rotated. During the parking process, the vehicle is braked or accelerated automatically. Furthermore, parking assistance systems are also known in which the driver receives instructions to brake or accelerate the vehicle himself.

BRIEF SUMMARY OF THE INVENTION

The control unit according to the present invention for driver assistance has the advantage over the related art that, on the one hand, the intervention in the drive train of the vehicle and in the braking system may be kept simple and, on the other hand, a steering operation to be performed by the driver may be reliably executed because the vehicle is braked when the driver has to perform a steering operation. The vehicle is braked until the steering operation is completed, so that the steering operation is performed with the vehicle at a standstill. Subsequently the driver may continue to drive the vehicle himself using the correctly set steering angle. Thus, not only is the driver given instructions, but it is also ensured that the vehicle is moved at a steering angle corresponding to the given steering instruction.

It is particularly advantageous to give the driver of the vehicle the option to cancel the blocking of the brakes via an appropriate interface even if the steering angle provided to him has not yet been set. This is advantageous in particular if the driver has modified his destination and he wishes to leave a parking space again or to choose another driving path.

It is furthermore advantageous not to brake the wheels of the vehicle until the vehicle is already at a standstill. A sudden braking of the vehicle which is not counted upon by the driver or, possibly, by the traffic behind, is avoided. The vehicle is, however, prevented from accidentally rolling away during the parking operation and the driver is prevented from accidentally driving off when the steering angle has not yet been set correctly.

It is furthermore advantageous to output a warning to the driver when the brake is released. In particular in the case when the driver parks on a slope, he may thus respond to the released automatic braking of the vehicle and may again independently resume the braking or acceleration of the vehicle.

It is advantageous in particular to use the control unit according to the present invention for driver assistance for parking the vehicle because, in particular in a parking operation, it is often necessary to steer with the vehicle at a standstill to make optimum use of the usually rather tight parking spaces. Against this background, it is advantageous to use the control unit according to the present invention in a parking device for a vehicle.

A method according to the present invention for driver assistance in which a braking system is not released until a predefined steering angle is reached during a steering operation to be performed at a standstill is also advantageous. Rolling away of the vehicle or driving the vehicle using a wrong steering angle which does not result in the desired target position of the vehicle, in particular into a parking space, is thus avoided.

DETAILED DESCRIPTION OF THE INVENTION

The present invention may be used for any vehicle, but it is advantageous in particular for vehicles which are capable of moving freely in a road traffic network. Due to the traffic density, which is usually high these days, a driver must move his vehicle very precisely in the road traffic. In particular, it is necessary to make use of a parking space, which is often rather tight, to park a vehicle in road traffic. Therefore, the control unit according to the present invention is elucidated in the following using the example of an application in a motor vehicle for a parking operation.

Figure 1:
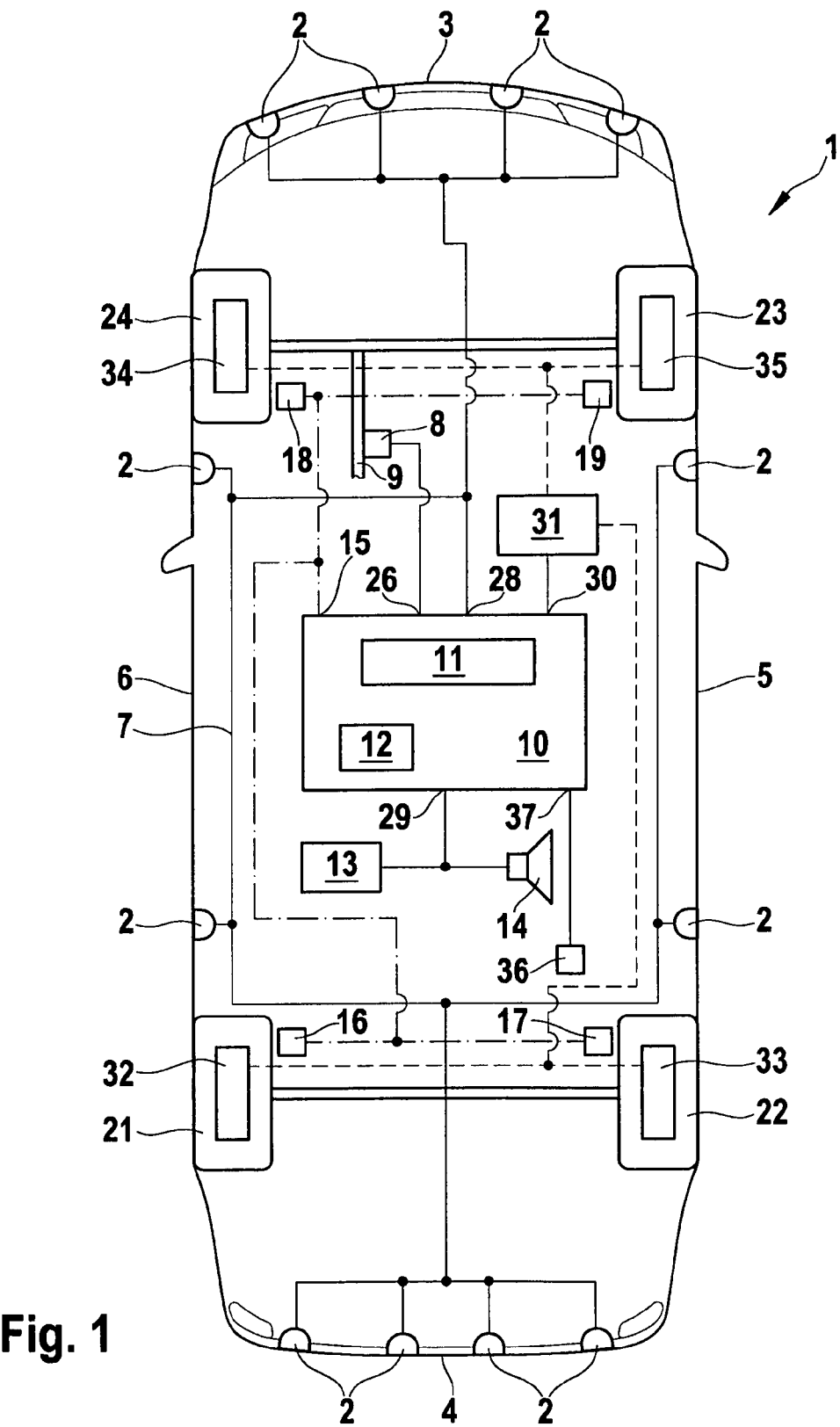
FIG. 1 shows a schematic top view of a vehicle having an exemplary embodiment for a control unit of a parking device according to the present invention.

FIG. 1 shows a motor vehicle 1, which is depicted schematically in a top view. The motor vehicle has distance sensors 2. In the configuration shown here, four distance sensors 2 are situated on a front side 3 of the vehicle and four distance sensors 2 are situated on a rear side 4 of the vehicle. Furthermore, two distance sensors are situated on a right side 5 of the vehicle and two distance sensors are situated on a left side 6 of the vehicle. Distance sensors 2 are advantageously designed as ultrasound sensors. In this case, distance sensors 2 emit an ultrasound signal, which is reflected by an obstacle. A distance to the obstacle may be calculated from the propagation time of the sound signal. For this purpose, distance sensors 2 are connected to a control unit 10 via a data bus 7, which is connected to control unit 10 via a data interface 28. Control unit 10 has an arithmetic unit 11, which is responsible for analyzing the distance data. In another specific embodiment, instead of ultrasound sensors, other distance sensors such as, for example, optical sensors or radar sensors may be used for distance measurement.

Arithmetic unit 11 is designed to calculate a surroundings model from the measured distance data and thus to determine an obstacle map of the surroundings of vehicle 1. Furthermore, arithmetic unit 11 is designed to determine a driving path of the vehicle around detected obstacles. It is thus possible to measure the length of a parking space using distance sensors 2 situated on right side 5 of vehicle 1, to determine the position of the obstacles delimiting the parking space, and to calculate a driving path of vehicle 1 into this parking space. The dimensions of the vehicle, stored in a memory 12 of control unit 10, are preferably taken into account here. To steer the vehicle into the parking space, instructions are output to the driver via a visual display 13 and/or an acoustic output unit 14. Visual display 13 and/or acoustic output unit 14 are connected to control unit 10 via a data interface 29. The output driving instructions may contain, on the one hand, driving the vehicle forward or in reverse, but also steering instructions. Since the effect of a steering wheel rotation while driving is a function of the vehicle's velocity, it is particularly simple to separate the forward and reverse driving using a certain steering angle on the one hand and the setting of the steering at a suitable steering angle on the other hand. Thus, either a certain fixed steering angle is used while driving or the steering wheel is rotated at a standstill. This makes it particularly easy for the driver to follow the steering instructions and driving instructions determined by control unit 10.

While driving, the distances to the obstacles in the surroundings of vehicle 1 are further monitored by distance sensors 2. If vehicle 1 gets too close to an obstacle, warnings to the driver may be output via display 13 and/or acoustic output unit 14.

The driver may follow the steering instructions with particular ease if he is requested to turn the steering wheel completely to the right or to the left or to drive in a straight line. To check whether a desired steering angle has also been set by the driver, control unit 10 is connected, via a data interface 26, to a steering angle sensor 8, which ascertains, for example, an angular position of a steering shaft 9 of the vehicle. To establish whether the vehicle is actually at a standstill when a steering operation is executed, control unit 10 is connected to wheel sensors 16, 17, 18, 19 via a data interface 15, the wheel sensors monitoring individual wheels 21, 22, 23, 24 of the vehicle. Wheel sensors 16, 17, 18, 19 of an ABS system, which report a wheel movement or a standstill of the wheels, may be used here.

Furthermore, control unit 10 has a data interface 30, which is connected to a triggering device 31 for controlling a braking system of the vehicle. The triggering device of the braking system may cooperate with braking systems 32, 33 of rear wheels 21, 22 and/or with braking systems 34, 35 of the front wheels via a data bus shown in dashed lines. In a first specific embodiment, braking systems 32, 33, 34, 35 may be designed as conventional brakes of the vehicle, in particular as disk brakes, which are used to decelerate the vehicle during the driving operation. However, in another specific embodiment, braking systems of a parking brake may also be used, which are normally used for preventing the vehicle from rolling away accidentally when the vehicle is parked.

Data interfaces 15, 26, 28, 29, 30, 37 may be situated on control unit 10 as individual data interfaces. In another specific embodiment it is, however, also possible to combine certain data interfaces over a data bus. It is thus possible, for example, to transmit the trigger signals to the braking system on the one hand and sensor data to control unit 10 via a so-called CAN (controller area network) bus on the other hand. Operating element 36 may be queried and information may be output to output devices 13, 14, for example, via a LIN bus. Sensors 2 may transmit data to control unit 10 via a suitable sensor data bus. The control unit preferably has suitable plug-in contacts, each with appropriate input wiring which form the data interfaces. Similarly, corresponding bus drivers or data bus interfaces which enable communication with the data transmission bus systems may also be provided on the data interface.

Control unit 10 itself may be situated at any location in the vehicle. Since control unit 10 itself does not need to be within the reach of a user, a location either in the engine compartment or also in an area of the instrument panel not directly accessible to the driver is possible in particular.

Control unit 10 is preferably designed for use in different vehicles; the corresponding vehicle data may be written into memory 12 via an interface which is not depicted in FIG. 1. Alternatively, it is also possible to provide an appropriate replaceable memory module for memory 12, so that a memory module having appropriate vehicle data is inserted into control unit 10 prior to installing control unit 10 into a vehicle.

Figure 2:
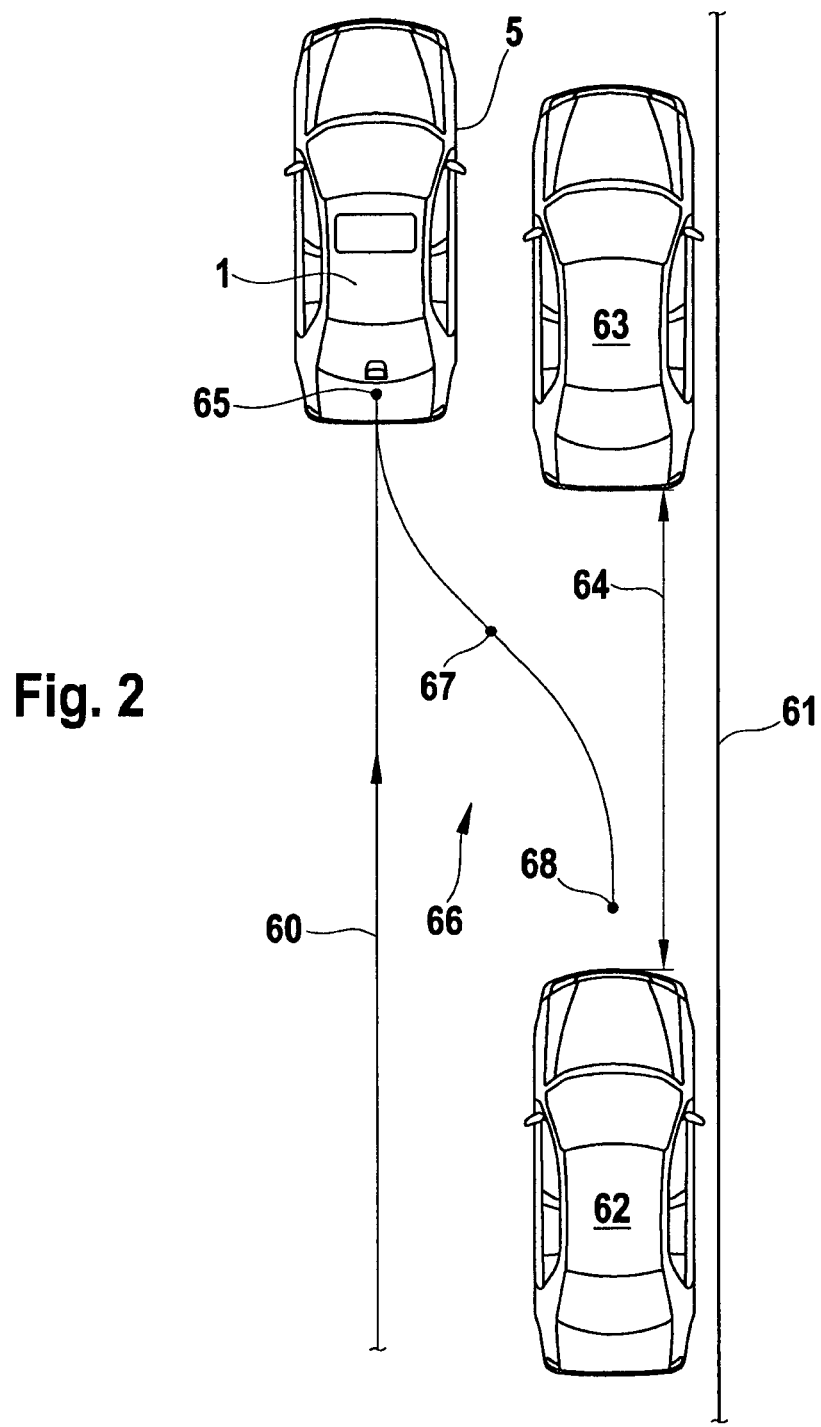
FIG. 2 shows a schematic sequence of a method according to the present invention during a parking operation.

The mode of operation of the control unit according to the present invention and of the parking device according to the present invention is elucidated in the following with reference to the driving example according to FIG. 2. Motor vehicle 1 is driven along its driving path in the direction of arrow 60 along a curb 61. Distance sensors situated on the right side 5 of the vehicle are activated. The sensors measure a lateral distance of the vehicle to obstacles and, when driving by, have ascertained the position of a first vehicle 62 and a second vehicle 63, which are parked at curb 61. Furthermore, the control unit ascertains a parking space 64 between first vehicle 62 and second vehicle 63, which is sufficiently large for motor vehicle 1, by analyzing the distance data. The instruction to stop and park in parking space 64 is now output to the driver via display 13 and/or acoustic output unit 14. The driver stops the vehicle in the position of a first turning point 65, the central position of the rear axle being shown in FIG. 2 as representing the position of the vehicle. In order to now park in parking space 64, the driver must first rotate the steering wheel suitably to the right. This instruction is output to the driver also via display 13 or acoustic output unit 14. Furthermore, the instruction to steer at a standstill is output if needed. Control unit 10, which has determined a driving path 66 into the parking space with the aid of arithmetic unit 11, has established fixed turning points for driving into the parking space such as, for example, first turning point 65. During driving path 66, the driver keeps the steering angle approximately constant up to the turning points to enable easier reproducibility of the recommended driving path by the driver. Steering operations, i.e., changes in the set steering angle, take place only at the turning points. At first turning point 65, for example, the driver receives the instruction to turn the steering wheel completely to the right. A full turn instruction has the advantage over other angles that a full turn is unambiguously defined by the steering stop. A driver may thus also check himself whether a full turn has been reached.

After the vehicle has reached the position of first turning point 65, wheel sensors 18, 19, 16, 17 check whether the vehicle is at a standstill. If this is the case, braking systems 34, 35 of the front axle and/or braking systems 32, 33 of the rear axle are activated by control unit 10 via brake triggering device 31. The driver may now steer in the suggested direction at a standstill according to the output of the steering instruction. Steering at a standstill is possible also if the vehicle is on a slope and the driver is not operating the brake himself.

The currently set steering angle is checked with the aid of steering angle sensor 8. Braking systems 32, 33 and/or 34, 35 are not released until the driver has reached a predefined steering angle which was determined by control unit 10, i.e., arithmetic unit 11. In the exemplary embodiment according to FIG. 2, such a steering angle would be a full turn to the right; a tolerance range of, for example, one-tenth of a steering wheel rotation may be provided. If the desired steering angle has been reached, braking systems 32, 33 and/or 34, 35 are automatically released after request by the control unit via data interface 30 to brake control device 31. A visual and/or acoustic warning that the brakes are being released is preferably output to the driver via output units 13, 14. An output of the direction—forward or reverse—in which he should now steer the vehicle is also preferably output to the driver. In particular, on the one hand, the output of a warning prevents the driver from being surprised by the automatic release of the brake. On the other hand, it is also achieved that the driver is informed about having reached a predefined angle to promptly continue to drive into the parking space. Similarly, the warning may also be output slightly, for example, one second, before the automatic release of the brakes. The driver may now continue to drive at the steering angle he has set up to second turning point 67. Additionally, an instruction not to change the steering angle may be output to the driver.

At second turning point 67, the instruction is output to the driver to stop the vehicle and turn the steering wheel, preferably completely, to the left. In the same way, as at first turning point 65, a check is made of whether the vehicle is at a standstill. If so, braking systems 32, 33 and/or 34, 35 are activated until the desired steering angle to the left has been set by the driver. The instruction is now output to the driver to continue to drive using the currently set steering angle. According to driving path 66, the driver may now continue to drive at the set steering angle. Driving the vehicle in the case where the calculated steering angle for parking into the parking space has not yet been set at second turning point 67 is thus prevented.

The driver now backs the vehicle up to third turning point 68. In the same way, a steering instruction is output again, this time to set the steering wheel straight. Similarly, the braking systems for holding the vehicle immobilized are activated and subsequently, after the required steering angle has been reached, released again. The driver may now drive the vehicle a bit more forward to suitably position it in the parking space without blocking first vehicle 62.

For the case where, at one turning point, the driver decides not to continue to drive into the parking space, an operating element 36 depicted in FIG. 1 is provided, which is read by control unit 10 via a data interface 37. If control unit 10 establishes that operating element 36 has been operated, braking systems 32, 33, 34, 35 are released if they have been activated by control unit 10. If necessary, an acoustic and/or visual warning is output to the driver.

In another exemplary embodiment, it is also possible that, although the vehicle is automatically braked, releasing the braking system requires approval by the driver. If the desired steering angle has been set, the brake is not released according to this specific embodiment until, for example, the driver additionally operates the gas pedal of the vehicle or sets a gear by releasing the pressure on the clutch pedal or, in the case of an automatic vehicle, shifts into a gear. A warning that the brake is being released may still be additionally output to the driver. If the predefined steering angle has not yet been set, the braking system preferably remains activated even when the driver engages the clutch or operates the gas pedal, so that the driver receives feedback due to the action of the brake resistance. The braking system will not be overridden and released by the driver in this case until a predefined force value is exceeded by the driver operating the drive.

Figure 3:
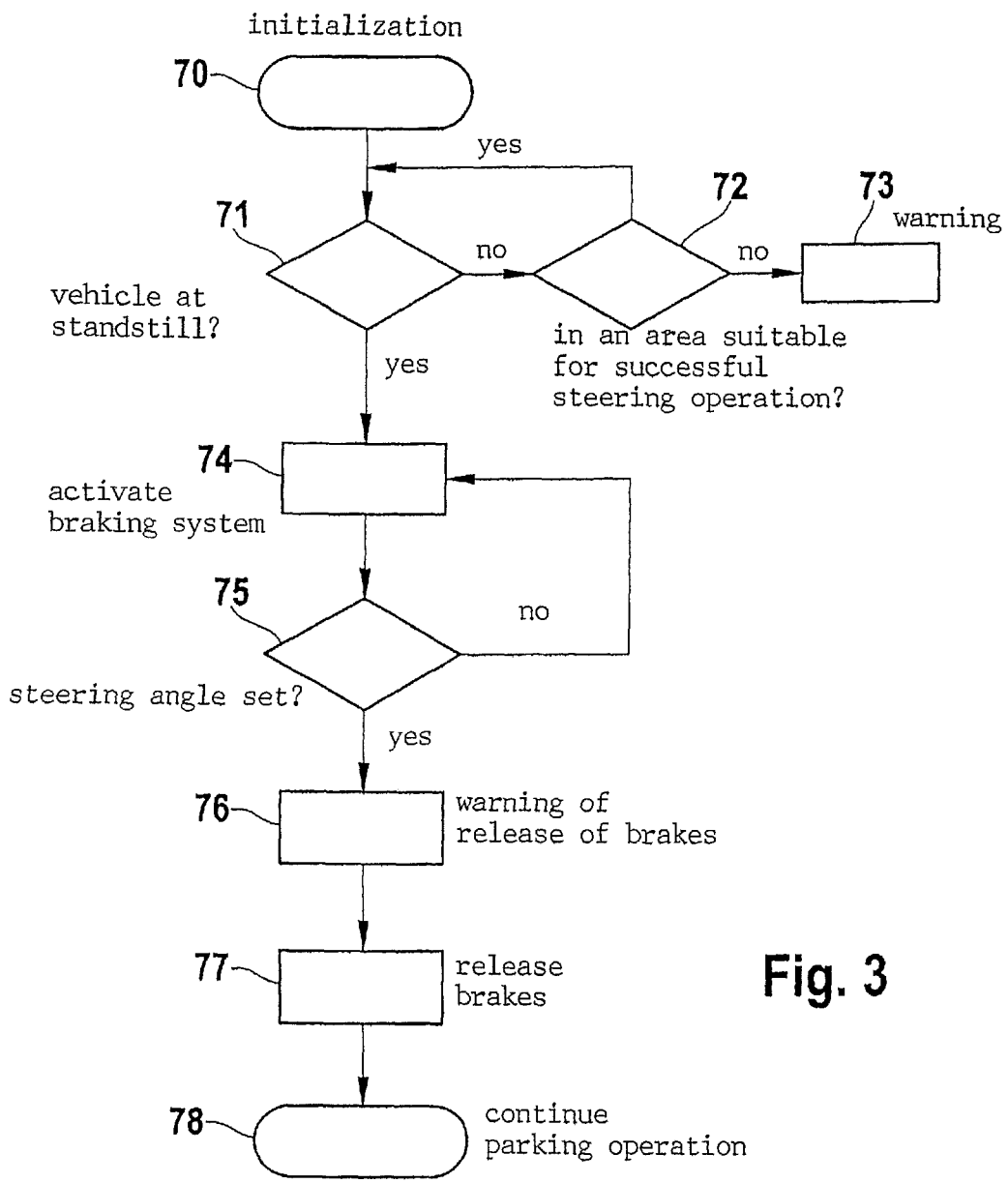
FIG. 3 shows an exemplary embodiment of a method sequence according to the present invention.

FIG. 3 shows the sequence of the method according to the present invention in sections. An initialization step 70 of the method is called when a steering operation of the vehicle is to be performed at a standstill according to a request by the control unit. In a first check step 71, a check is made of whether the vehicle is already at a standstill. If this is not the case, the method branches to a second check step 72, where a check is made of whether the vehicle is still in an appropriate area in which a steering operation may be successfully performed. If this is the case, the method branches back to first check step 71. If necessary, the warning to the driver to stop the vehicle may be repeated. If the vehicle has already left a suitable stopping area, for example, an area within 10 cm in both directions of one of turning points 65, 67, 68, the method branches further to a warning step 73. In this case, even a full turn of the steering wheel may not yield the desired result without correcting the position of the vehicle because the vehicle has already passed a suitable stopping area for performing a steering operation in the desired direction. In warning step 73, the driver is either requested to move the vehicle in the opposite direction or informed that driving further into the parking space is not possible.

If it is established in first check step 71 that the vehicle is at a standstill, the method branches further to an activation step 74, in which the braking system of the vehicle is activated, so that the vehicle is held in the desired position. In a third, subsequent check step 75 a check is made by querying steering angle sensor 8 via data interface 26 whether the steering angle calculated by arithmetic unit 11 has been set. If this is not the case, the vehicle continues to be braked. If, however, the desired steering angle has been reached, the method branches further to a warning step 76, in which the driver is acoustically and/or visually warned of a release of the brakes. In a subsequent deactivation step 77, the braking system is released, so that the vehicle is able to move freely again. The further parking operation is continued in a subsequent step 78.

What is claimed is:

1. A control unit configured to provide automated driving assistance for a vehicle, comprising:
   a first data interface configured to query sensors for detecting surroundings data of the vehicle;
   a second data interface configured to query a steering angle of the vehicle;
   an arithmetic unit configured to ascertain driving instructions from the surroundings data of the vehicle transmitted by the sensors;
   a third data interface configured to output the driving instructions, the driving instructions including at least one instruction to perform a steering of the vehicle at a standstill;
   a fourth data interface configured to selectively activate a braking system of the vehicle such that the vehicle remains braked during the steering performed at a standstill until a predefined steering angle determined by the control unit is reached; and
   a fifth interface configured to query motion sensors of the vehicle, wherein the braking system is not activated during the steering performed at a standstill until the query of the motion sensors ascertains a standstill of the wheels of the vehicle.

2. The control unit as recited in claim 1, further comprising:
   a sixth data interface configured to query an input device for releasing the braking system braked during the steering performed at a standstill.

3. The control unit as recited in claim 2, wherein the third data interface is configured to output a warning when the braking system is released.

4. A parking-assist device for a vehicle, comprising:
   surroundings sensors for detecting surroundings data of the vehicle;
   an output unit for conveying information to a driver of the vehicle;
   a steering angle sensor;
   a triggering unit configured to electronically activate a braking system of the vehicle; and
   a control unit including:
      a first data interface configured to query the surroundings sensors for detecting surroundings data of the vehicle;

a second data interface configured to query the steering angle sensor for a steering angle of the vehicle;

an arithmetic unit configured to ascertain driving instructions from the surroundings data of the vehicle transmitted by the sensors;

a third data interface configured to output the driving instructions, the driving instructions including at least one instruction to perform a steering of the vehicle at a standstill;

a fourth data interface configured to selectively activate the braking system of the vehicle such that the vehicle remains braked during the steering performed at a standstill until a predefined steering angle determined by the control unit is reached; and a fifth interface configured to query motion sensors of the vehicle, wherein the braking system is not activated during the steering performed at a standstill until the query of the motion sensors ascertains a standstill of the wheels of the vehicle.

5. A method for automated driving assistance for a vehicle, comprising:

detecting a current steering angle;

outputting driving instructions to a driver of the vehicle, the driving instructions including at least one steering instruction for steering at a standstill of the vehicle;

activating a braking system such that the braking system is braked during the steering performed at a standstill; and not releasing the braking system until a predefined steering angle has been reached during the steering performed at a standstill;

wherein motion sensors of the vehicle are queried prior to activating the braking system during the steering performed at a standstill, and wherein the activating of the braking system takes place only if the vehicle is determined to be at a standstill.

6. The method as recited in claim 5, wherein a parking brake of the vehicle is activated during the steering performed at a standstill.

7. The method as recited in claim 6, wherein a warning is output when the braking system is released.

\* \* \* \* \*